UNITED STATES PATENT OFFICE.

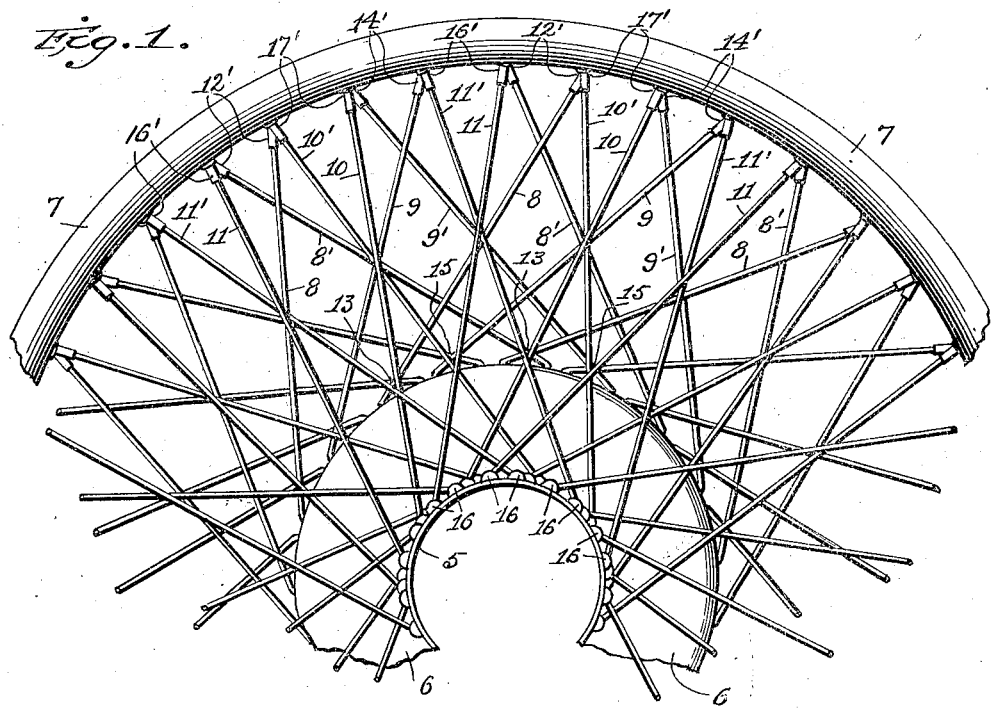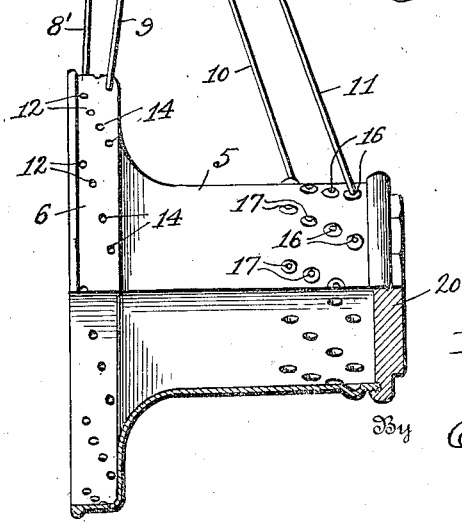

LOUIS SANFORD WEIL, OF GLENROSE, OHIO.

WIRE-SPOKE WHEEL.

1,375,267.

Specification of Letters Patent.  Patented Apr. 19, 1921.

Application filed June 9, 1920.  Serial No. 387,554.

*To all whom it may concern:*

Be it known that I, LOUIS SANFORD WEIL, a citizen of the United States, residing at Glenrose, in the county of Clermont and State of Ohio, have invented certain new and useful Improvements in Wire-Spoke Wheels, of which the following is a specification.

This invention relates to improvements in wire-spoke wheels, and has for its particular object to so arrange the wire-spokes in a manner to provide a double set of outer spokes lying substantially in parallel rows, and spaced from each other a sufficient distance to preserve a support for the rim and tire should the extreme outer set of spokes be ripped off or be injured in an accident.

This and other objects hereinafter set forth are attained by the means illustrated in the accompanying drawing, in which:—

Figure 1 is a view in side elevation of a portion of one of the improved wheels, and Fig. 2 is a vertical transverse section of one-half of the wheel showing the hub partly in side elevation and omitting the spokes and portion of the rim which lie beyond the line of section.

Similar reference numerals in all of the figures of the drawing designate like parts.

The construction shown in the drawing, consists of a metal hub of the usual type having an elongated barrel portion 5 and a flange portion 6 of greater diameter than the barrel portion, and a metal rim 7 which is also of a common type known as a clencher rim. The rim 7 is connected to the hub by four double rows or sets of spokes, embodying an outer flange-set, an inner flange-set, an outer barrel-set 10, and an inner barrel-set 11.

The outer flange set comprises two rows of spokes 8 and 8′ secured at their inner ends in apertures 12 formed in the flange 6, and at their outer ends are secured to the rim 7 at points 12′, adjacent its rear edge, and these spokes 8 and 8′ extend in opposite directions from the flange 6 in a manner to cross each other at points 13. Inner flange-set also comprises two rows of spokes 9 and 9′ which have their inner ends suitably connected in apertures 14 in the flange 6, and their outer ends are connected to the middle of the rim at 14′, and these spokes also extend in opposite directions from the flange 6 in a manner to cross each other at the points 15. Thus are provided two independent sets of crossed spokes extending from the flange of the hub, and these sets are alternately arranged with respect to each other around the wheel.

The outer barrel-set of spokes comprises two rows of spokes 11, 11′ which extend from the outer end of the hub to the outer edge of the rim at points 16′, and their inner ends are preferably connected in any suitable manner to projections 16 formed on the hub. Inner barrel-set also comprises two rows of spokes 10, 10′ which are connected to, and extend from projections 17 located back of the outer rows a substantial distance, say one inch in a full-size wheel, and their outer ends are connected to the middle of rim at points 17′ in close relation to the outer ends of the spokes 9 and 9′. The companion spokes in each of these two rows also extend tangentially in opposite directions from the barrel 5 and cross each other at points slightly above the surface of the barrel, and couples of the spokes in these two rows are also arranged alternately with respect to each other the same as with the flange spokes above described.

From the above description taken in connection with the drawing, it will be seen that double rows of both rear and front spokes are provided with the spokes in each double row arranged independent of or out of alinement with the spokes in the adjacent rows, so that should the spokes 8, 8′ or 11, 11′ of either of the outer rows be ripped out by accident, there will still remain the inner supporting sets of spokes which are spaced a sufficient distance from the outer spokes to ordinarily prevent their destruction at the same time with the outer sets.

The outer end of the hub is provided with a nut-cap 20 which can be secured thereto in any suitable manner.

Having thus fully described the invention, what is claimed is:—

1. In a wheel of the character described, a plurality of rows of spokes arranged to form a flange-group which extends forwardly only to the center of the rim and inner and outer barrel-sets uncrossed relative to each other and extending from near the outer end of the hub to the center and outer edge of the rim respectively.

2. In a wheel of the character described, a plurality of rows of spokes arranged to form a flange-group which extends forwardly only to the center of the rim and inner and outer barrel-sets uncrossed relative to each other and extending from near the outer end of the hub to the center and outer edge of the rim respectively, each of said inner and outer barrel-sets comprising a double row of crossed tangential spokes.

3. In a wheel of the character described, a plurality of rows of spokes arranged to form inner and outer flange sets uncrossed relative to each other, and inner and outer barrel-sets uncrossed relative to each other and extending from near the outer end of the hub to the center and outer edge of the rim respectively.

4. In a wheel of the character described, a plurality of rows of spokes arranged to form inner and outer flange sets uncrossed relative to each other, and inner and outer barrel-sets uncrossed relative to each other and extending from near the outer end of the hub to the center and outer edge of the rim respectively, each of said sets, both of the flange and the barrel, comprising a double row of crossed tangential spokes.

In testimony whereof I affix my signature.

LOUIS SANFORD WEIL.